United States Patent
Sakai et al.

(10) Patent No.: US 10,823,590 B2
(45) Date of Patent: Nov. 3, 2020

(54) ENVIRONMENTAL SENSOR

(71) Applicant: OMRON Corporation, Kyoto (JP)

(72) Inventors: Ryusuke Sakai, Kyoto (JP); Naotsugu Ueda, Kusatsu (JP); Kayo Nakamura, Kusatsu (JP); Takanobu Yamauchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 25 days.

(21) Appl. No.: 15/869,137

(22) Filed: Jan. 12, 2018

(65) Prior Publication Data

US 2018/0259377 A1  Sep. 13, 2018

(30) Foreign Application Priority Data

Mar. 13, 2017  (JP) ................................ 2017-047457

(51) Int. Cl.
  *G01D 21/02* (2006.01)
  *G08B 25/08* (2006.01)
  *G08B 21/24* (2006.01)
(52) U.S. Cl.
  CPC ............ *G01D 21/02* (2013.01); *G08B 21/24* (2013.01); *G08B 25/08* (2013.01)
(58) Field of Classification Search
  CPC ......... G01D 21/02; G08B 21/24; G08B 25/08
  USPC ....................................................... 340/506
  See application file for complete search history.

(56) References Cited

U.S. PATENT DOCUMENTS

| | | | | |
|---|---|---|---|---|
| 3,582,932 A | * | 6/1971 | Chapman | G01V 3/087 340/551 |
| 4,589,081 A | * | 5/1986 | Massa | G08B 23/00 340/501 |
| 6,646,564 B1 | * | 11/2003 | Azieres | G08B 25/14 340/506 |
| 8,962,207 B2 | * | 2/2015 | Kajiwara | G01M 3/007 429/443 |
| 9,116,137 B1 | | 8/2015 | Gettings et al. | |
| 2001/0024163 A1 | | 9/2001 | Petite | |
| 2004/0201477 A1 | * | 10/2004 | Matoba | G08B 13/1409 340/568.1 |

(Continued)

FOREIGN PATENT DOCUMENTS

| | | |
|---|---|---|
| CN | 104484032 A | 4/2015 |
| CN | 105511631 A | 4/2016 |

(Continued)

OTHER PUBLICATIONS

The extended European search report (EESR) dated Jul. 5, 2018 in a counterpart European application.

(Continued)

*Primary Examiner* — Kam Wan Ma
(74) *Attorney, Agent, or Firm* — Metrolex IP Law Group, PLLC

(57) ABSTRACT

An environmental sensor for measuring physical quantities associated with a surrounding environment includes one or more sensor elements that detect the physical quantities, and a communication unit that transmits, when a physical quantity detected by at least one of the sensor elements included in the environmental sensor changes in accordance with a predetermined rule, a predetermined maintenance signal including unit identification information identifying at least the environmental sensor.

9 Claims, 7 Drawing Sheets

(56) References Cited

U.S. PATENT DOCUMENTS

| | | | | |
|---|---|---|---|---|
| 2005/0275528 | A1* | 12/2005 | Kates | G08B 1/08 340/539.22 |
| 2010/0013631 | A1* | 1/2010 | Laackmann | G06K 19/07 340/540 |
| 2010/0248661 | A1* | 9/2010 | Bullock | G08B 25/009 455/127.1 |
| 2011/0215923 | A1* | 9/2011 | Karim | G08B 25/007 340/540 |
| 2011/0301770 | A1* | 12/2011 | Rutman | B60L 11/182 700/292 |
| 2013/0311146 | A1* | 11/2013 | Miller | H04W 16/18 703/1 |
| 2015/0310720 | A1* | 10/2015 | Gettings | G08B 29/188 340/540 |
| 2015/0347791 | A1* | 12/2015 | Desai | G06K 19/0705 340/10.1 |
| 2016/0063845 | A1* | 3/2016 | Lloyd | G08B 21/187 340/679 |
| 2016/0063850 | A1* | 3/2016 | Yang | G08B 23/00 340/539.22 |
| 2016/0066068 | A1* | 3/2016 | Schultz | H04Q 9/00 340/870.07 |
| 2016/0166156 | A1* | 6/2016 | Yuen | A61B 5/0002 340/573.1 |
| 2016/0239342 | A1* | 8/2016 | Miry | G06Q 10/0631 |
| 2016/0247128 | A1* | 8/2016 | Horstemeyer | G06Q 10/20 |
| 2016/0282618 | A1* | 9/2016 | Kon | G06F 3/011 |
| 2017/0160733 | A1* | 6/2017 | Oostendorp | G08B 21/182 |
| 2017/0205962 | A1 | 7/2017 | Li et al. | |
| 2017/0284840 | A1* | 10/2017 | Mino | G01D 21/02 |
| 2017/0343499 | A1* | 11/2017 | Wang | G05B 19/042 |
| 2018/0033951 | A1 | 2/2018 | Shiragami | |
| 2018/0270632 | A1 | 9/2018 | Kaneeda et al. | |

FOREIGN PATENT DOCUMENTS

| | | |
|---|---|---|
| JP | 2002-251681 A | 9/2002 |
| JP | 2006-300734 A | 11/2006 |
| JP | 2011-253216 A | 12/2011 |
| WO | 03/004975 A1 | 1/2003 |
| WO | 2016/019431 A1 | 2/2016 |
| WO | 2016/136899 A1 | 9/2016 |
| WO | 2016/136989 A1 | 9/2016 |

OTHER PUBLICATIONS

The Office Action dated Jan. 28, 2020 in a counterpart Japanese patent application.
The Office Action dated Mar. 2, 2020 in a related Chinese patent application.

* cited by examiner

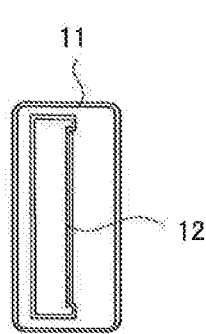
FIG. 1A
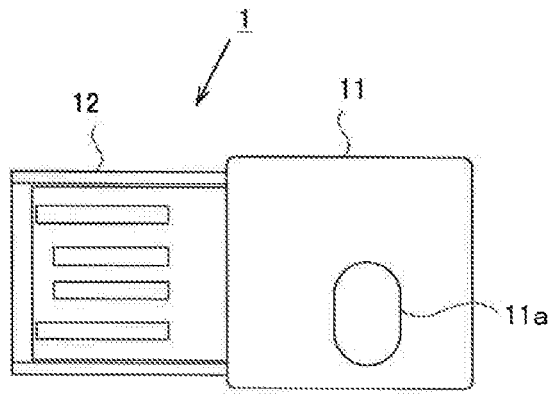
FIG. 1B
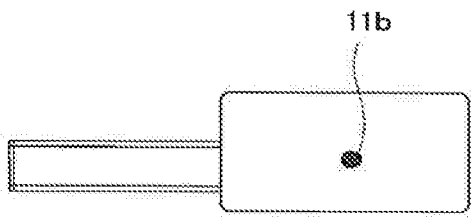
FIG. 1C
FIG. 2
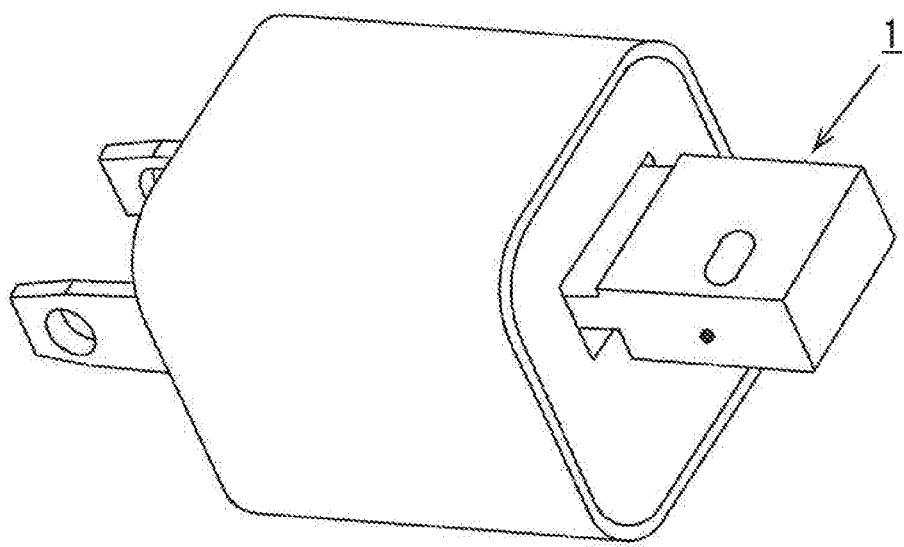

FIG. 5

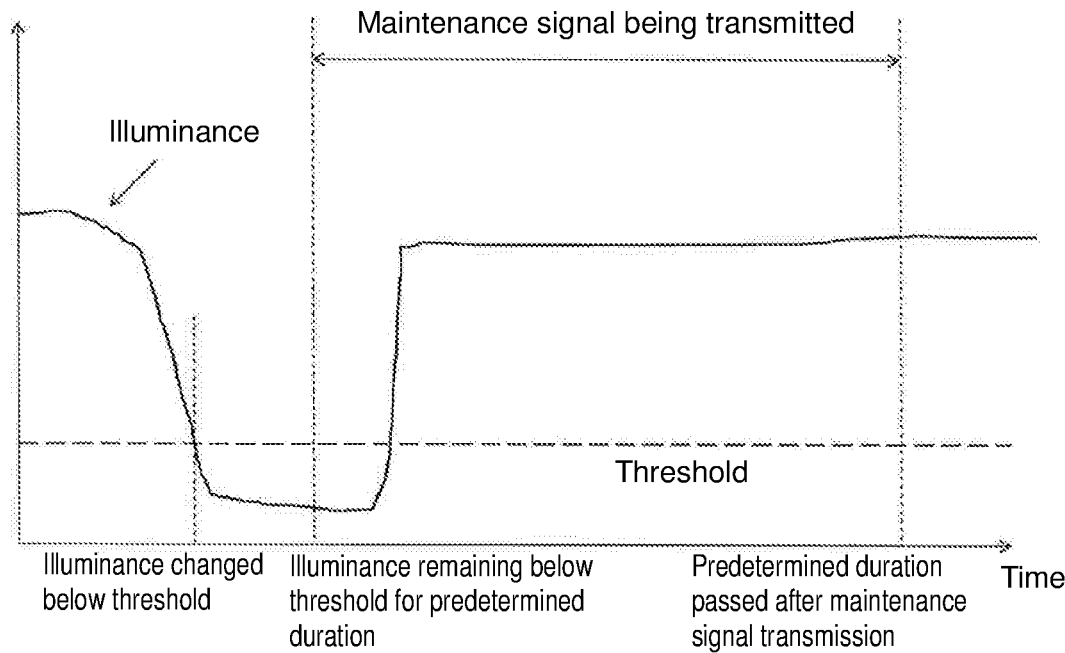

FIG. 6

| ID | Operating status | ALERT |
|---|---|---|
| OMSENCE-0001 | ON | |
| OMSENCE-0002 | ON | |
| OMSENCE-0003 | ON | Temperature: high |
| OMSENCE-0004 | OFF | No data |
| OMSENCE-0005 | ON | |
| OMSENCE-0006 | ON | Illuminance: low |
| OMSENCE-0007 | ON | |
| OMSENCE-0008 | Error | No data |
| OMSENCE-0009 | ON | |
| OMSENCE-0010 | ON | |
| OMSENCE-0011 | ON | Sound pressure: high |
| OMSENCE-0012 | ON | |
| OMSENCE-0013 | ON | |
| OMSENCE-0014 | OFF | No data |
| OMSENCE-0015 | OFF | No data |
| OMSENCE-0016 | ON | Temperature: high   Humidity: high   $CO_2$: high |
| OMSENCE-0017 | ON | |
| OMSENCE-0018 | ON | |
| OMSENCE-0019 | Error | No data |
| OMSENCE-0020 | ON | |

FIG. 7

| ID | Operating status | ALERT |
|---|---|---|
| OMSENCE-0001 | ON | |
| OMSENCE-0002 | ON | |
| OMSENCE-0003 | ON | Temperature: high |
| OMSENCE-0004 | OFF | No data |
| OMSENCE-0005 | ON | |
| OMSENCE-0006 | ON | Illuminance: low |
| OMSENCE-0007 | ON | |
| OMSENCE-0008 | Error | No data |
| OMSENCE-0009 | ON | |
| OMSENCE-0010 | ON | |
| OMSENCE-0011 | ON | Sound pressure: high |
| OMSENCE-0012 | ON | |
| OMSENCE-0013 | ON | |
| OMSENCE-0014 | OFF | No data |
| OMSENCE-0015 | OFF | No data |
| OMSENCE-0016 | ON | Temperature: high  Humidity: high  CO2: high |
| OMSENCE-0017 | ON | |
| OMSENCE-0018 | ON | |
| OMSENCE-0019 | Error | No data |
| OMSENCE-0020 | ON | |

US 10,823,590 B2

ENVIRONMENTAL SENSOR

CROSS REFERENCE TO RELATED APPLICATIONS

This application claims priority from prior Japanese Patent Application No. 2017-047457 filed with the Japan Patent Office on Mar. 13, 2017, the entire contents of which are incorporated herein by reference.

FIELD

The disclosure relates to an environmental sensor that measures a plurality of physical quantities associated with a surrounding environment.

BACKGROUND

Devices including various measurement units for obtaining biometric information about a user or environmental information about the surrounding environment have been developed (e.g., Patent Literature 1). A device described in Patent Literature 1 includes a plurality of measurement units and a notification unit. Also, various sensor elements have been developed to detect physical quantities including temperature, humidity, atmospheric pressure, and a light level. Micro electro mechanical systems (MEMS) sensor elements (hereafter also referred to as MEMS sensors) using MEMS technology, which are compact and consume low power, now receive attention. Such compact and low power MEMS sensor elements may be incorporated in a single device, enabling the design of an environmental sensor including multiple different sensor elements.

An environmental sensor with this structure can detect multiple physical quantities associated with, for example, an office environment or a living space, and can obtain, for example, various items of information such as biometric information and environmental information, in addition to energy-related information such as electric power. Such information can then be used to support multidirectional analysis and use of information.

Many such environmental sensors may be used to obtain environmental information at different points in a predetermined area (e.g., a house), and the obtained environmental information may then be managed centrally by a system for effective use of information (e.g., Patent Literature 2).

At a site where a plurality of environmental sensors are used, an environmental sensor that has obtained environmental information is to be identified. Typically, each environmental sensor is given an identification number for management.

At the site with such environmental sensors, an operator for maintenance work may intend to distinguish a target environmental sensor from other sensors before starting the maintenance work.

CITATION LIST

Patent Literature

Patent Literature 1: Japanese Unexamined Patent Application Publication No. 2006-300734

Patent Literature 2: Japanese Unexamined Patent Application Publication No. 2011-253216

SUMMARY

Technical Problem

An environmental sensor known in the art may have its identification number printed or engraved on the casing, or may have a sticker or a plate showing the identification number to identify each individual sensor.

However, the identification number on the casing of each sensor may wear or disappear and may become unreadable over time.

A compact environmental sensor may have an insufficient surface area for showing its identification number. Such smaller environmental sensors can easily be installed in various spaces. Thus, more sensors may be installed to obtain more detailed information about the environment. However, many environmental sensors without identification numbers used at one site cannot be identified for maintenance and inspection.

In response to the above situation, one or more aspects are directed to a unit for identifying an individual environmental sensor at its installation site using sensor elements included in the environmental sensor, without adding other mechanical components to the environmental sensor.

Solution to Problem

In response to the above issue, one or more aspects have the features described below.

One aspect provides an environmental sensor for measuring physical quantities associated with a surrounding environment. The environmental sensor includes one or more sensor elements that detect the physical quantities, and a communication unit that transmits a predetermined maintenance signal including unit identification information identifying at least the environmental sensor when a physical quantity detected by at least one of the sensor elements included in the environmental sensor changes in accordance with a predetermined rule.

As described above, the target physical quantities detected by the sensor elements inherently included in the environmental sensor may be changed intentionally in accordance with the predetermined rule to transmit unit identification information identifying the environmental sensor. This enables identification of the environmental sensor that has transmitted a signal with its identification number from other environmental sensors in a management system by, for example, receiving the signal with a management terminal. Thus, the environmental sensor can be identified at its installation site when the identification number is unreadable, without adding new mechanical components to the environmental sensor.

The predetermined rule may include the physical quantity detected by the at least one of the sensor elements being maintained lower than a first predetermined threshold for a first predetermined duration after the physical quantity decreases from a value higher than the first predetermined threshold to a value lower than the first predetermined threshold. The predetermined rule may include the physical quantity detected by the at least one of the sensor elements maintained higher than a second predetermined threshold for a second predetermined duration after the physical quantity increases from a value lower than the second predetermined threshold to a value higher than the second predetermined threshold.

The target physical quantities changing across a predetermined threshold are used as the initial conditions to prevent a maintenance signal to be transmitted repeatedly under an environmental condition that allows the target physical quantities to remain higher or lower than the predetermined threshold. The predetermined threshold for each target physical quantity is set to a value that is normally undetectable to prevent a maintenance signal from being transmitted unintentionally by an accidental change in the surrounding environment.

The predetermined rule includes the physical quantity detected by the at least one of the sensor elements changing to a value higher than a third predetermined threshold and a value lower than the third predetermined threshold repeatedly a predetermined number of times within a third predetermined duration.

As described above, the target physical quantity values changing like pulse signals are used as the rule to prevent a third party uninformed of the rule from operating the environmental sensor to unintentionally transmit a maintenance signal.

The predetermined rule includes the physical quantity detected by the at least one of the sensor elements changing by at least a predetermined value within a fourth predetermined duration.

As described above, changes in the target physical quantities are used as the conditions to promptly transmit a maintenance signal without using much time and efforts.

The above conditions may be combined as the predetermined rule. For example, the illuminance being maintained lower than a predetermined threshold and the sound pressure level being maintained higher than a predetermined threshold may be combined as the predetermined rule to prevent unintentional transmission of a signal in a more reliable manner.

The physical quantity detected by the at least one of the sensor elements may be an illuminance. The illuminance as a target physical quantity may be intentionally changed or maintained easily by, for example, blocking light to be detected by an illuminance sensor or illuminating the illuminance sensor with a lighting tool. The environmental sensor may include an illuminance sensor element to detect an illuminance. This allows the physical quantity to be intentionally changed easily in accordance with the predetermined rule.

Another aspect provides an environmental information obtainment system including a plurality of environmental sensors each including one or more sensor elements that detect physical quantities associated with a surrounding environment, and a communication unit that transmits a predetermined maintenance signal including unit identification information when a physical quantity detected by at least one of the sensor elements included in the environmental sensor changes in accordance with a predetermined rule, and a management terminal that receives the maintenance signal transmitted from the communication unit and manages the plurality of environmental sensors.

Another aspect provides a method for controlling an environmental sensor including one or more sensor elements that detect physical quantities associated with a surrounding environment and a communication unit. The method includes detecting the physical quantities with the sensor elements included in the environmental sensor, determining a change in a physical quantity in accordance with a predetermined rule detected by at least one of the sensor elements included in the environmental sensor, and transmitting a predetermined maintenance signal including unit identification information identifying at least the environmental sensor when determining the change in the physical quantity in accordance with the predetermined rule.

A program according to another aspect enables the environmental sensor to implement the steps included in the method for controlling the environmental sensor.

Another aspect provides an environmental sensor including at least one of the components and the functions described above. Other aspects provide a method for controlling the environmental sensor including the processes described above, a program enabling a computer (processor) to implement the processes included in the method, or a non-transitory computer-readable storage medium storing the program. The components and the processes described above may be combined when such combinations cause no technical conflicts between them.

Advantageous Effects

One or more aspects allow an environmental sensor to be identified at its installation site using sensor elements included in the environmental sensor, without adding other mechanical components to the environmental sensor.

BRIEF DESCRIPTION OF THE DRAWINGS

FIG. 1A is an external left view illustrating an environmental sensor unit according to a first embodiment, FIG. 1B is an external plan view illustrating an environment sensor unit according to a first embodiment, and FIG. 1C is an external front view illustrating an environmental sensor unit according to a first embodiment.

FIG. 2 is a diagram illustrating an environmental sensor unit according to a first embodiment connected to a universal serial bus (USB) power adopter.

FIG. 5 is a graph illustrating a predetermined rule under which a maintenance signal is transmitted by an environmental sensor unit according to a first embodiment.

FIG. 6 is a diagram illustrating a list displayed on a mobile terminal for managing environmental sensor units according to a first embodiment.

FIG. 7 is a diagram illustrating an example change in a list displayed on a mobile terminal for management in response to a maintenance signal.

DETAILED DESCRIPTION

Embodiments will now be described with reference to the drawings. The dimensions, materials, shapes, and relative positions of the components described in the embodiments described below are not intended to limit the technical scope of the invention, unless otherwise specified.

First Embodiment

Structure of Environmental Sensor

Figure 10:
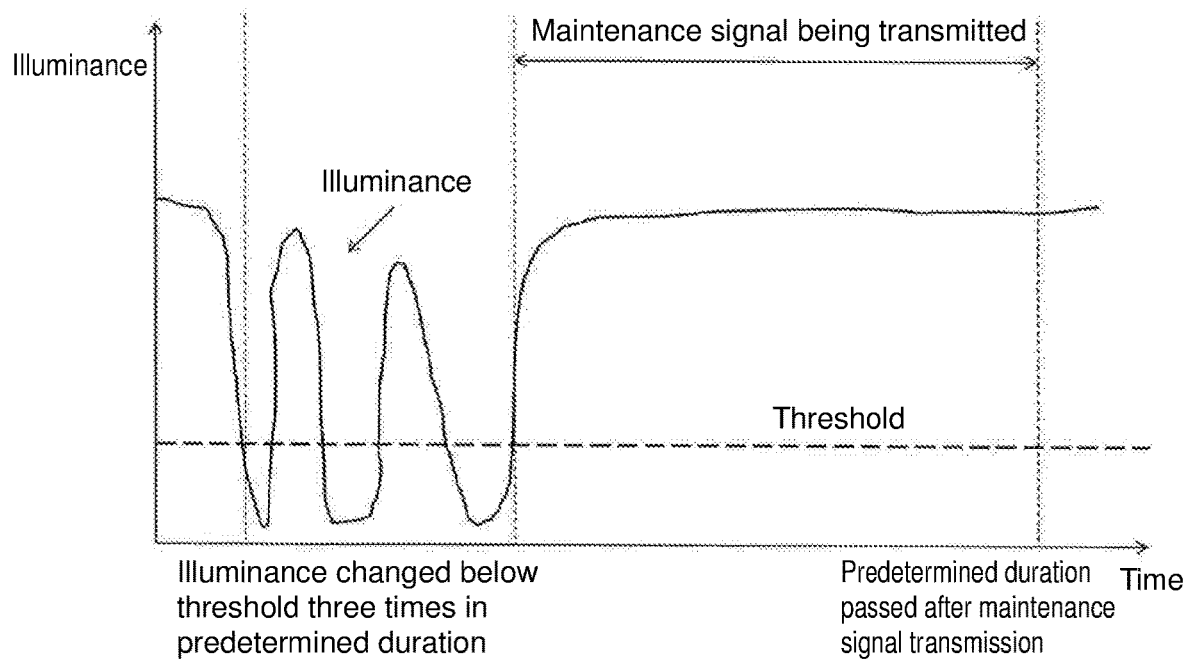
FIG. 10 is a graph illustrating a predetermined rule under which a maintenance signal is transmitted by an environmental sensor unit according to a second embodiment.

FIGS. 1A to 1C are external views of an environmental sensor unit 1 according to a first embodiment. FIG. 1A is a left view, FIG. 1B is a plan view, and FIG. 10 is a front view of the environmental sensor unit 1. As shown in FIGS. 1A to 1C, the environmental sensor unit 1 mainly includes a body 11, which has a casing, and a power connector 12.

The power connector 12 is a universal serial bus (USB) terminal (type A, male). The power connector 12 is connected to, for example, a USB terminal (type A, female) on a personal computer (PC) connected to a power supply, or a terminal of a USB power adopter (type A, female) to externally supply power to the environmental sensor unit 1. FIG. 2 is a diagram showing the environmental sensor unit 1 connected to the USB power adopter.

Figure 3:
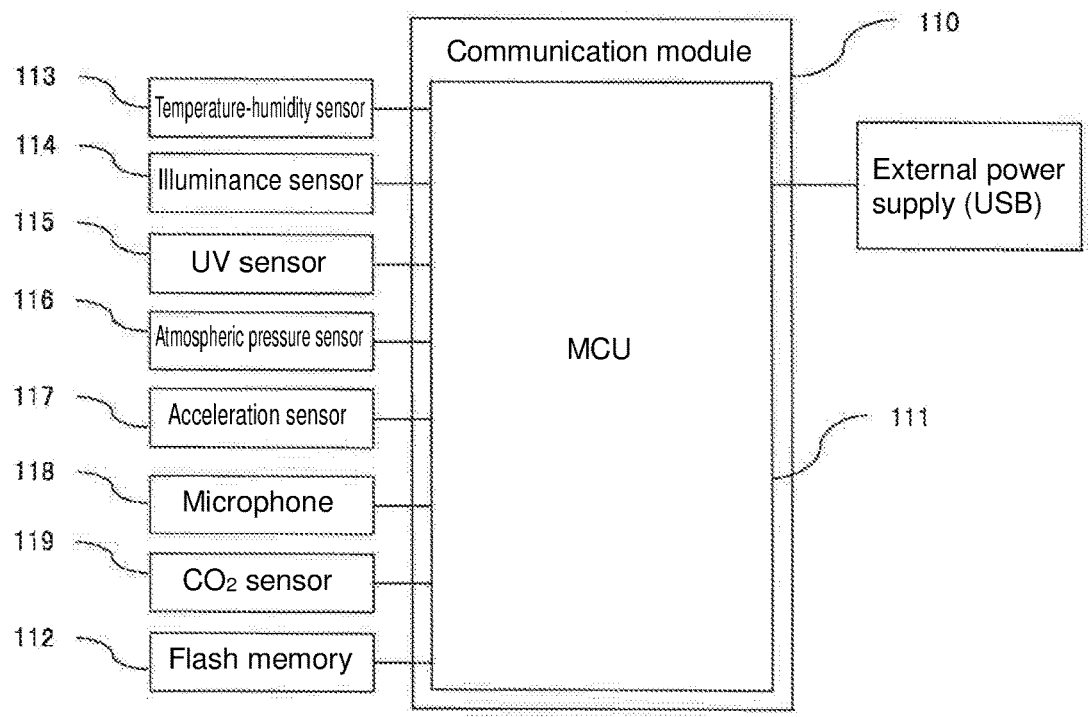
FIG. 3 is a block diagram illustrating the main components of an environmental sensor unit according to a first embodiment.

FIG. 3 is a block diagram showing the main components of the environmental sensor unit 1. As shown in FIG. 3, the casing of the body 11 contains a communication module 110, which performs wireless communication, a plurality of sensors as sensor elements, a micro control unit (MCU) 111, which is capable of processing information, and a flash memory 112, which stores various items of data.

The environmental sensor unit 1 according to an embodiment includes a temperature-humidity sensor 113, an illuminance sensor 114, an ultraviolet (UV) sensor 115, an atmospheric pressure sensor 116, an acceleration sensor 117, a microphone 118, and a $CO_2$ sensor 119.

The temperature-humidity sensor 113, which includes a temperature sensor and a humidity sensor mounted on a single chip, detects the temperature and the humidity around the environmental sensor unit 1. To allow this, the casing of the body 11 has a vent 11 b to allow the outside air to flow into the casing. The target physical quantities are measured by the temperature-humidity sensor 113, the atmospheric pressure sensor 116, the microphone 118, and the $CO_2$ sensor 119 using the outside air around the environmental sensor unit 1 flowing through the vent 11b into the casing.

The illuminance sensor 114 detects the brightness (amount of visible rays) around the environmental sensor unit 1. The UV sensor 115 detects the amount of ultraviolet rays around the environmental sensor unit 1. The casing has a lighting window 11a, which is formed from a transparent material such as an acrylic resin, to allow these sensors to receive light.

The atmospheric pressure sensor 116, which is an absolute pressure sensor, detects the atmospheric pressure around the environmental sensor unit 1. The acceleration sensor 117, which uses the micro electro mechanical systems (MEMS) technology using semiconductors, detects the acceleration applied to the environmental sensor unit 1 to determine the operating status of a movable unit on which the environmental sensor unit 1 is mounted, or to detect an abnormality such as an earthquake when the environmental sensor unit 1 is fixed at its installation location.

The microphone 118 detects a sound pressure level around the environmental sensor unit 1. The microphone 118 obtains information with high sensitivity by detecting the vibration of the outside air entering through the vent 11b.

The $CO_2$ sensor 119 measures the amount of carbon dioxide in the environment surrounding the environmental sensor unit 1. In the same manner as the temperature-humidity sensor, the $CO_2$ sensor 119 measures the amount of carbon dioxide contained in the outside air entering through the vent 11b.

The physical quantities detected by the above sensors in the environment surrounding the environmental sensor unit 1 are stored into the flash memory 112 and/or are transmitted to a separate management terminal through wireless communication. The wireless communication may be performed with any scheme, such as a wireless local area network (LAN) or Bluetooth (registered trademark).

Transmitting Maintenance Signal

Figure 4:
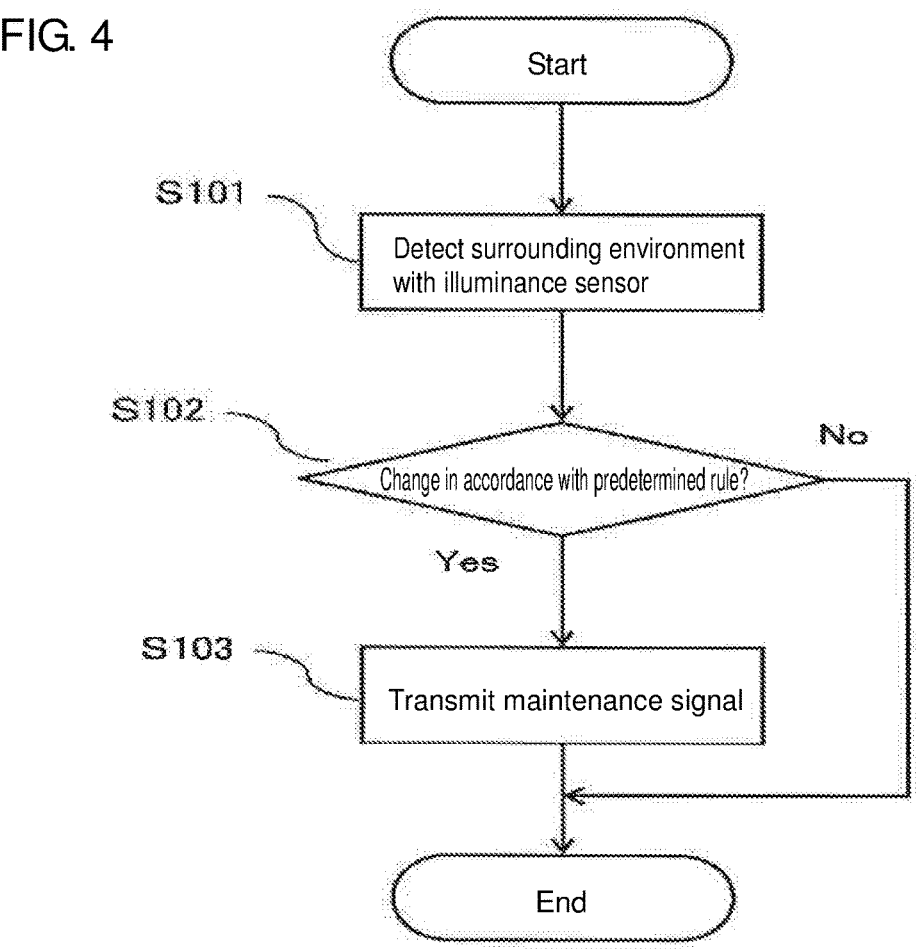
FIG. 4 is a flowchart illustrating the processing performed before a maintenance signal is transmitted by an environmental sensor unit according to a first embodiment.

A mechanism with which the environmental sensor unit 1 according to an embodiment transmits a predetermined maintenance signal including unit identification numbers using its sensors will now be described with reference to FIGS. 4 and 5. FIG. 4 is a flowchart showing the processing performed before the environmental sensor unit 1 transmits a maintenance signal. FIG. 5 is a graph showing the relationship between the illuminance detected by the illuminance sensor 114 on the vertical axis, and time on the horizontal axis indicating the transmission timing of a maintenance signal.

As shown in FIG. 4, the environmental sensor unit 1 first obtains physical quantities from the surrounding environment using the sensors including the illuminance sensor 114 (step S101). The environmental sensor unit 1 then determines whether a change in the illuminance in accordance with a predetermined rule (described later) is detected by the illuminance sensor 114 (step S102). When no such change is detected, the processing ends. When the change is detected (step S102), the processing advances to step S103, and the environmental sensor unit 1 causes the communication module 110 to transmit a maintenance signal, and ends the processing. This routine is executed repeatedly by a processor (not shown) included in the MCU 111 at predetermined intervals.

Changes in the physical quantities in accordance with the predetermined rule in an embodiment will now be described. In the environmental sensor unit 1, as shown in FIG. 5, the communication module 110 transmits a maintenance signal for a predetermined duration (e.g., one minute) when the illuminance detected by the illuminance sensor 114 remains lower than a predetermined threshold for at least a predetermined duration (e.g., five seconds) after the illuminance decreases from a value higher than the predetermined threshold (e.g., 5 lux) to a value lower than the threshold. In an embodiment, the illuminance detected by the illuminance sensor 114 being maintained lower than 5 lux for five seconds after the illuminance decreases from a value higher than 5 lux to a value lower than 5 lux corresponds to the predetermined rule in the claims.

In some embodiments, the predetermined rule may be defined conversely. The predetermined rule may include the illuminance being maintained higher than the threshold for a predetermined duration after the illuminance increases from a value lower than a predetermined threshold to a value higher than the predetermined threshold. In this case, the predetermined threshold may be set to a high value (e.g., 600 lux), differently from the above threshold.

A program for controlling the environmental sensor unit 1 in the manner described above may be stored in the MCU 111, or may be stored in and read from the flash memory 112.

Method of Management

A method for managing a plurality of environmental sensor units 1 according to an embodiment installed in a predetermined space, or specifically a method for identifying each environmental sensor unit 1 for maintenance, will now be described. The predetermined space herein includes any space such as a relatively large space including the whole area of a commercial facility, a factory, a school, an office building, or a warehouse, or may be a relatively small space including a predetermined area inside a house, a hospital, or a nursing home.

FIG. 6 is a list of environmental sensor units 1 under management. The list appears on a mobile terminal (not shown), such as a smartphone, for managing a plurality of environmental sensor units 1. The list includes identification numbers (IDs), and the operating status of each environmental sensor unit 1 under management. The list also shows an alert with its details for each environmental sensor unit 1 having an abnormality in the obtained physical quantities. The manager uses this list to easily determine the operating status of each environmental sensor unit 1 having an identification number, as well as the presence of an abnormality in the environment surrounding each environmental sensor unit 1.

At a site where a plurality of environmental sensor units 1 are installed, the manager may intend to determine the ID of a currently targeted sensor unit (or to identify a target environmental sensor unit 1). However, the list does not provide this information.

When the manager intends to identify the target environmental sensor unit 1, such as when the environmental sensor unit 1 is to be inspected or repaired, or when the values obtained by the environmental sensor unit 1 in the surrounding environment are to be compared with values perceived by a human, the manager performs an operation to cause the environmental sensor unit 1 to transmit a maintenance signal. The maintenance signal is then received by a mobile terminal used for management to identify the environmental sensor unit 1 that has transmitted the maintenance signal (the currently targeted sensor unit receiving the operation).

More specifically, the lighting window 11 a of the environmental sensor unit 1 in operation (the environmental sensor unit 1 having the sensors detecting the physical quantities associated with the surrounding environment) is covered with a hand to block light detected by the illuminance sensor 114. Thus, the illuminance incident on the illuminance sensor 114 decreases below the predetermined threshold. When the illuminance remains below the threshold for at least five seconds, the environmental sensor unit 1 transmits a maintenance signal including its unit identification number.

The mobile terminal used for management receiving the maintenance signal displays the list of environmental sensor units 1 including a close-up of the environmental sensor unit 1 that has transmitted the maintenance signal, with the other environmental sensor units 1 being hatched (refer to FIG. 7). This allows the manager to identify the target environmental sensor unit 1 at the site where the environmental sensor units 1 are installed.

As described above, changing the illuminance measured by the illuminance sensor 114 in the environmental sensor unit 1 in accordance with the predetermined rule causes the environmental sensor unit 1 to transmit a maintenance signal including its unit identification number, which is then received by the mobile terminal used for management. This enables identification of individual sensor units at a site where a plurality of the sensor units are installed, without adding other mechanical components to the environmental sensor unit.

Although a maintenance signal is transmitted for the illuminance detected below a predetermined illuminance for at least five seconds in an embodiment, this duration may be longer or shorter than five seconds, and may be, for example, ten seconds or three seconds. The duration for which a maintenance signal is transmitted may also not be one minute but may be longer or shorter than one minute.

The mobile terminal used for management may not be a smartphone, but may be any device that has display and wireless communication capabilities. In some embodiments, the mobile terminal may be a general-purpose terminal, such as a tablet terminal or a notebook computer, or a terminal dedicated to management.

Second Embodiment

An environmental sensor unit according to another embodiment will now be described with reference to FIGS. 8A to 10. The environmental sensor unit according to an embodiment differs from the environmental sensor unit according to a first embodiment in its structure and its predetermined rule to transmit a maintenance signal. The environmental sensor unit according to an embodiment has its main components and management methods common to the corresponding components and methods for the environmental sensor unit of a first embodiment. Such common components are given the same reference numerals as in a first embodiment, and will not be described in detail.

Structure of Environmental Sensor

Figures 8A, 8B:
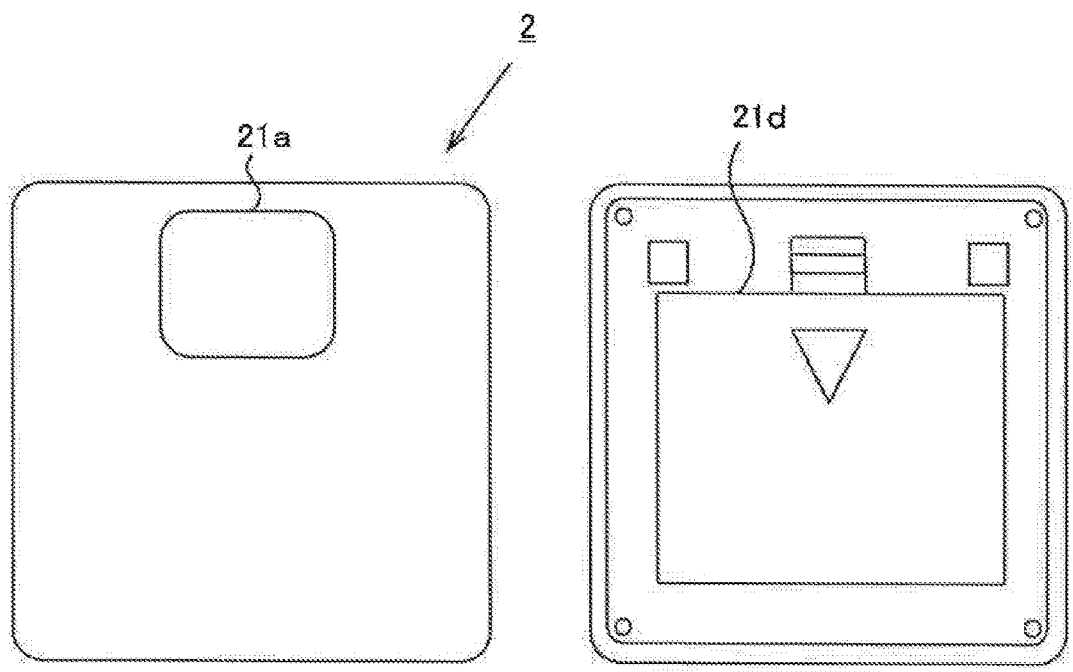
FIG. 8A is an external front view illustrating an environmental sensor unit according to a second embodiment.
FIG. 8B is an external back view illustrating an environmental sensor unit according to a second embodiment.
Figure 8C:
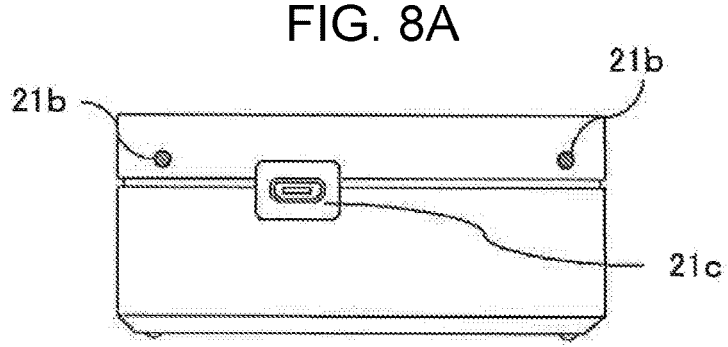
FIG. 8C is an external bottom view illustrating an environmental sensor unit according to a second embodiment.
Figure 9:
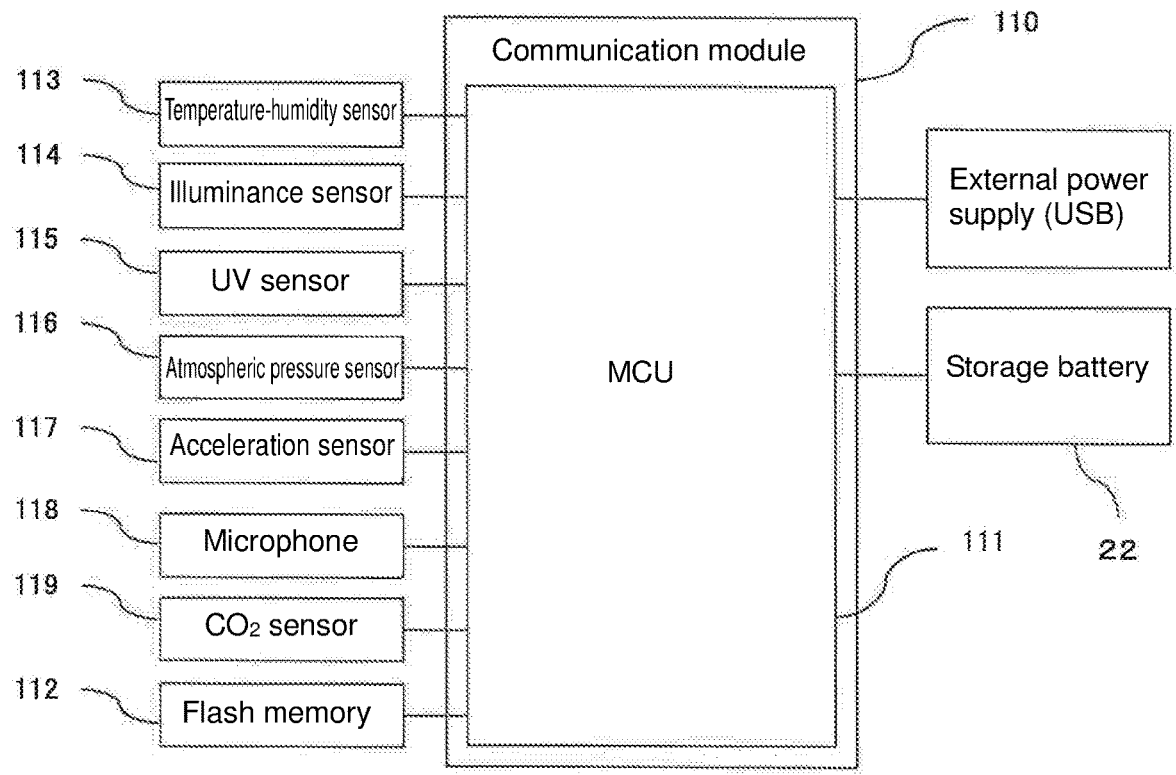
FIG. 9 is a block diagram illustrating the main components of an environmental sensor unit according to a second embodiment.

FIGS. 8A to 8C are external views of an environmental sensor unit 2 according to a second embodiment. FIG. 8A is a front view of the environmental sensor unit 2, FIG. 8B is its back view, and FIG. 8C is its bottom view. FIG. 9 is a block diagram showing the main components of the environmental sensor unit 2.

As shown in FIGS. 8A to 8C, the environmental sensor unit 2 includes a substantially rectangular casing as viewed from the front. The casing has a lighting window 21a on its front, which is formed from a transparent material, a lid 21d (described later) on its back for replacement of batteries, and vents 21b and a power terminal 21c (USB micro B, female) on its bottom. As in a first embodiment, the lighting window 21a, which is formed from a transparent material, is located to allow the illuminance sensor 114 and the UV sensor 115 to receive light entering through the lighting window 21a. As in a first embodiment, the vents 21b in the bottom allow the target physical quantities to be measured by the temperature-humidity sensor 113, the atmospheric pressure sensor 116, the microphone 118, and the $CO_2$ sensor 119 using the outside air around the environmental sensor unit 2 flowing through the vents 21b.

As in a first embodiment, the casing contains the communication module 110, various sensors, the MCU 111, the flash memory 112, and a storage battery 22 (e.g., a lithium ion battery) in a removable manner. The lid 21d on the back of the casing is to be open to replace the storage battery 22. A disposable primary battery may be used in placed of the storage battery 22.

The environmental sensor unit 2 may operate on an external power supply connected to its power terminal 21c or on the storage battery 22 without connection to a power supply. The storage battery 22 may be recharged through the power terminal 21c connected to an external power supply.

Thus, the environmental sensor unit 2 may be installed in a place without an external power supply to obtain information from the surrounding environment or may be carried by a user to obtain the physical quantities in the environment surrounding the user.

Predetermined Rule for Transmitting Maintenance Signal

The predetermined rule under which the environmental sensor unit 2 transmits a maintenance signal including its unit identification number will now be described. FIG. 10 is a graph showing the relationship between the illuminance detected by the illuminance sensor 114 in the environmental sensor unit 2 on the vertical axis, and time on the horizontal axis indicating the transmission timing of a maintenance signal.

In the environmental sensor unit 2, as shown in FIG. 10, the communication module 110 transmits a maintenance signal for one minute when the illuminance detected by the illuminance sensor 114 decreases below a predetermined threshold (e.g., 5 lux), and increases above the predetermined threshold repeatedly a predetermined number of times (e.g., three times) within a predetermined continuous duration (e.g., ten seconds). In an embodiment, the predetermined rule in the claims corresponds to the illuminance detected by the illuminance sensor 114 decreasing below 5 lux and increasing above 5 lux three times within ten seconds.

To change the illuminance detected by the illuminance sensor 114 in accordance with the predetermined rule of an embodiment, for example, the user may cover the lighting window 21a in the casing of the environmental sensor unit 2 with his or her hand to block light incident on the illuminance sensor 114 and then immediately remove the hand to allow the illuminance sensor 114 to detect light entering through the lighting window 21a. This operation may be repeated three times within ten seconds.

In an embodiment, as described above, the environmental sensor unit 2 can incorporate a battery, and thus can be used at sites with no external power supply. Further, an embodiment uses the predetermined rule defined to represent the target physical quantity values changing like pulse signals. This prevents a third party uninformed of the predetermined rule from operating the sensor unit to unintentionally transmit a maintenance signal.

The environmental sensor unit 2 is managed with the same method as described in a first embodiment, and will not be described.

Third Embodiment

Another embodiment of a predetermined rule for causing an environmental sensor unit to transmit a maintenance signal including its unit identification number will now be described with reference to FIG. 11. An embodiment differs from a first embodiment in the predetermined rule, and the structure of the environmental sensor unit and its management methods in an embodiment are the same as described in a first embodiment.

Figure 11:
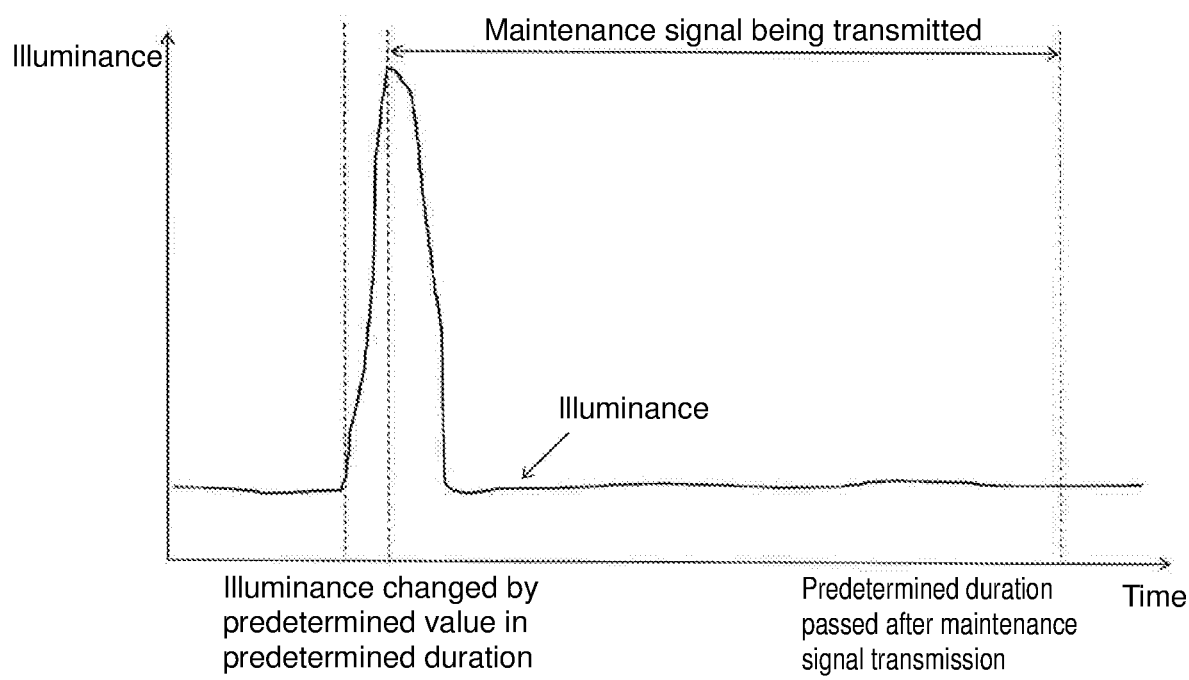
FIG. 11 is a graph illustrating a predetermined rule under which a maintenance signal is transmitted by an environmental sensor unit according to a third embodiment.

FIG. 11 is a graph showing the relationship between the illuminance detected by the illuminance sensor 114 in the environmental sensor unit 1 on the vertical axis, and time on the horizontal axis indicating the transmission timing of a maintenance signal. As shown in FIG. 11, the environmental sensor unit 1 transmits a maintenance signal for a predetermined duration (e.g., one minute) from its communication module 110 when the illuminance detected by the illuminance sensor 114 changes by at least a predetermined value (e.g., 400 lux) within a predetermined continuous duration (e.g., two seconds).

In an embodiment, the illuminance detected by the illuminance sensor changing by at least 400 lux within two seconds corresponds to the predetermined rule in the claims.

To change the illuminance detected by the illuminance sensor 114 in accordance with the predetermined rule according to an embodiment, for example, a mobile lighting tool (e.g., an LED penlight) may be placed near the lighting window 11a to illuminate the casing of the environmental sensor unit 1 for . For the environmental sensor unit 1 in a bright surrounding environment, or specifically for the environmental sensor unit 1 in the surrounding environment having the illuminance exceeding 500 lux, the lighting window 11a may be covered with his or her hand to block light incident on the illuminance sensor 114.

In an embodiment, a change in each target physical quantity is set to a threshold to allow each individual sensor unit to be identified promptly without using much time and efforts.

Other Modifications

The above embodiments have been described by way of example only, and the present invention is not limited to the specific embodiments described above. Various modifications may be made to the present invention within the scope of its technical idea. Although the above embodiments use the illuminance detected by the illuminance sensor as the target physical quantity to which the predetermined rule for transmitting a maintenance signal is applied, the target physical quantity may be a sound pressure level detectable by a microphone. In this case, the physical quantity surrounding the environmental sensor unit may be changed intentionally by, for example, clapping hands or producing a voice near the environmental sensor unit to transmit a maintenance signal in response to the change.

The predetermined rule may apply to multiple physical quantities for transmitting a maintenance signal and may apply to a combination of different physical quantities detected by different sensors. In some embodiments, a maintenance signal may be transmitted when the temperature detected by the temperature-humidity sensor and the amount of carbon dioxide detected by the $CO_2$ sensor both exceed their predetermined thresholds. In this case, a maintenance signal may be transmitted when, for example, a user blows air toward the vent in the casing of the environmental sensor unit to change the physical quantities of the environment surrounding the environmental sensor unit.

REFERENCE SIGNS LIST 1, 2 environmental sensor unit
11 body
11a, 21a lighting window
11b, 21b vent
12 power connector
21c power terminal
21d lid
22 storage battery

The invention claimed is:

1. A method for controlling an environmental sensor comprising one or more sensor elements that comprise at least an illuminance sensor configured to detect physical quantities that comprise at least an illuminance associated with a surrounding environment and a communication unit, the method comprising:

detecting the illuminance capable of being intentionally changed in accordance with a predetermined rule, with the illuminance sensor;

determining that a change in the illuminance detected by the illuminance sensor has been intentionally changed in accordance with the predetermined rule; and transmitting a predetermined maintenance signal comprising unit identification information identifying at least the illuminance sensor in response to the determining, wherein the intentional change of the illuminance in accordance with the predetermined rule comprises intentionally blocking the light detected by the illuminance sensor by a user, the predetermined maintenance signal is transmitted for a predetermined duration in response to the intentional change of the illuminance detected by the illuminance sensor having changed in accordance with the predetermined rule, and the transmission of the predetermined maintenance signal comprising the unit identification information identifies that the illuminance measured by the at least one identified sensor associated with the unit identification information has been intentionally changed in accordance with the predetermined rule.

2. A non-transitory computer-readable storage medium storing a program, which when read and executed, causes an environmental sensor to perform operations comprising operations of the method for controlling the environmental sensor according to claim 1.

3. The method according to claim 1, wherein
the predetermined rule comprises the physical quantity detected by the at least one of the sensor elements being maintained lower than a first predetermined threshold for a first predetermined duration after the physical quantity decreases from a value higher than the first predetermined threshold to a value lower than the first predetermined threshold.

4. The method according to claim 1, wherein
the predetermined rule comprises the physical quantity detected by the at least one of the sensor elements changing to a value higher than a third predetermined threshold and a value lower than the third predetermined threshold repeatedly a predetermined number of times within a third predetermined duration.

5. The method according to claim 1, wherein
the predetermined rule comprises the physical quantity detected by the at least one of the sensor elements changing by at least a predetermined value within a fourth predetermined duration.

6. The method according to claim 1, wherein
the physical quantity detected by the at least one of the sensor elements comprises a temperature.

7. The method according to claim 1, wherein
the physical quantity detected by the at least one of the sensor elements comprises a humidity.

8. The method according to claim 1, wherein
the physical quantity detected by the at least one of the sensor elements comprises an amount of carbon dioxide in an environment surrounding the environmental sensor.

9. The method according to claim 1, wherein the physical quantity detected by the at least one of the sensor elements comprises a sound pressure level.

* * * * *